(12) United States Patent
Schneider

(10) Patent No.: US 10,703,319 B2
(45) Date of Patent: Jul. 7, 2020

(54) VEHICLE SEAT WITH AN ADJUSTABLE HEADREST AND INTEGRATED REAR SEAT AIRBAG

(71) Applicant: AUTOLIV ASP, INC., Ogden, UT (US)

(72) Inventor: David W. Schneider, Waterford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 135 days.

(21) Appl. No.: 15/907,454

(22) Filed: Feb. 28, 2018

(65) Prior Publication Data
US 2019/0263346 A1    Aug. 29, 2019

(51) Int. Cl.
| | | |
|---|---|---|
| *B60R 21/207* | (2006.01) | |
| *B60N 2/427* | (2006.01) | |
| *B60N 2/838* | (2018.01) | |
| *B60R 21/231* | (2011.01) | |
| *B60N 2/894* | (2018.01) | |

(Continued)

(52) U.S. Cl.
CPC .......... *B60R 21/207* (2013.01); *B60N 2/4279* (2013.01); *B60N 2/42727* (2013.01); *B60N 2/809* (2018.02); *B60N 2/838* (2018.02); *B60N 2/894* (2018.02); *B60R 21/231* (2013.01); *B60R 21/013* (2013.01); *B60R 2021/2074* (2013.01);
(Continued)

(58) Field of Classification Search
CPC ... B60R 21/207; B60R 21/231; B60R 21/013; B60R 2021/2074; B60R 2021/23153; B60R 2021/23161; B60N 2/42727; B60N 2/4279; B60N 2/838
See application file for complete search history.

(56) References Cited

U.S. PATENT DOCUMENTS

| | | | |
|---|---|---|---|
| 5,782,529 A | * | 7/1998 | Miller, III ............. B60R 21/207 280/730.1 |
| 7,798,570 B2 | | 9/2010 | Kwiecinski et al. |

(Continued)

FOREIGN PATENT DOCUMENTS

KR    19980036608 U    9/1998

OTHER PUBLICATIONS

International Search Report and Written Opinion for corresponding International Application No. PCT/US 18/63030; dated Apr. 26, 2019.

*Primary Examiner* — Drew J Brown
(74) *Attorney, Agent, or Firm* — Stephen T. Olson; Harness, Dickey & Pierce, P.L.C.

(57) ABSTRACT

A vehicle seat includes a seatback, a headrest and an airbag unit. The seatback has a front side and a rear side. The headrest is connected to the seatback by at least one post and is adjustable relative to the seatback in a vertical direction. The airbag unit is carried by the seatback and includes an airbag and an inflator. The airbag is rearwardly deployable from the rear side of the seatback from a stored position proximate an upper end of the seatback. The at least one post is oriented relative to the airbag unit in a position selected from a group consisting of a first position in which the at least one post includes a lower end vertically above the airbag unit with a line along an elongated axis of the at least one post intersecting the airbag unit and a second position on which the at least one post is laterally spaced from the airbag unit.

16 Claims, 4 Drawing Sheets

(51) Int. Cl.
*B60N 2/809* (2018.01)
*B60R 21/013* (2006.01)
(52) U.S. Cl.
CPC .............. *B60R 2021/23153* (2013.01); *B60R 2021/23161* (2013.01)

(56) References Cited

U.S. PATENT DOCUMENTS

| | | | |
|---|---|---|---|
| 9,586,552 | B1 | 3/2017 | Whitens et al. |
| 2004/0145223 | A1* | 7/2004 | Lee ........................ B60N 2/838 297/216.12 |
| 2013/0278027 | A1* | 10/2013 | Brucato ................. B60N 2/838 297/216.12 |
| 2015/0091280 | A1* | 4/2015 | Nagasawa ............. B60R 21/013 280/730.1 |
| 2015/0091281 | A1* | 4/2015 | Nagasawa ............ B60N 2/4228 280/730.1 |
| 2015/0091282 | A1 | 4/2015 | Nagasawa et al. |
| 2017/0305310 | A1* | 10/2017 | Toyomi ................... B60N 2/80 |
| 2018/0056831 | A1* | 3/2018 | James .................... B60N 2/882 |
| 2018/0319358 | A1* | 11/2018 | Schneider ............. B60R 21/233 |
| 2019/0283701 | A1* | 9/2019 | Zauritz ................. B60R 21/231 |

* cited by examiner

VEHICLE SEAT WITH AN ADJUSTABLE HEADREST AND INTEGRATED REAR SEAT AIRBAG

FIELD

The present disclosure generally relates to occupant safety restraint systems. More particularly, the present disclosure relates to a vehicle seat having an adjustable headrest and an integrated rear seat airbag.

BACKGROUND

This section provides background information related to the present disclosure which is not necessarily prior art.

Various passive and active occupant restraint systems are known for enhancing occupant protection in the event of a pending or actual vehicle impact. Passive systems are deployed with no action required by the occupant. For example, the use of frontal airbags protecting a vehicle occupant in the event a frontal crash or a laterally offset frontal crash is common in modern automotive technology. The frontal airbag for the driver is usually located in the hub area of the steering wheel and the frontal airbag for the front seated passenger is usually located inside the instrument panel.

For many years, attempts have been made to adapt frontal airbag technologies to provide enhanced protection for a rear seated occupant. In this regard, various seating solutions have been proposed in which an airbag is mounted to a forward vehicle seat for rearward deployment.

While known arrangements including a vehicle seat with a rearwardly deployable airbag may have proven to be generally acceptable for specifically intended purposes, such systems for rear seat occupant protection are generally associated with disadvantages. In this regard, airbags for these known systems generally require relatively large cushion volumes, generally require more inflation gas to fill, and generally require more packaging space within the vehicle seat. Due to the relatively large cushion size, such airbags may require inflators with faster rise rates. Additionally, these airbags may not best accommodate rear-facing child seats.

Accordingly, it remains desirable to advance the relevant art by further enhancing rear occupant protection.

SUMMARY

This section provides a general summary of the disclosure, and is not a comprehensive disclosure of its full scope or all of its features.

The present teachings generally provide embodiments of a vehicle seat that accommodate a rear occupant airbag that may have a reduced airbag cushion size while achieving proper coverage of the top of the seatback and headrest. The airbag unit may be mounted within the seatback in close proximity to the top of the seatback. The present teachings overcome significant challenges otherwise resulting from reduced packaging space available in the seatback proximate the top of the seatback.

In accordance with one particular aspect, the present teachings provide a vehicle seat including a seatback, a headrest and an airbag unit. The seatback has a front side and a rear side. The headrest is connected to the seatback by at least one post and is adjustable relative to the seatback in a generally vertical direction. The airbag unit is carried by the seatback and includes an airbag and an inflator. The airbag is rearwardly deployable from the rear side of the seatback from a stored position proximate an upper end or top of the seatback. The at least one post is oriented relative to the airbag unit in a position selected from a group consisting of a first position in which the at least one post includes a lower end vertically above the airbag unit with a line along an elongated axis of the at least one post intersecting the airbag unit and a second position on which the at least one post is laterally spaced from the airbag unit.

In accordance with another particular aspect, the present teachings provide a vehicle seat including a seatback having a front side and a rear side. The vehicle seat additionally includes a headrest and at least one post adjustably connecting the headrest and the seatback. The vehicle seat further includes an airbag unit having an airbag and an inflator. The airbag unit is carried by the seatback. The airbag is rearwardly deployable from the rear side of the seatback from a stored position proximate an upper end of the seatback. The at least one post is laterally spaced from the airbag unit.

In accordance with yet another particular aspect, the present teachings similarly provide a vehicle seat including a seatback having a front side and a rear side. Again, the vehicle seat additionally includes a headrest and at least one post adjustably connecting the headrest and the seatback. The vehicle seat further includes an airbag unit having an airbag and an inflator. The airbag unit is carried by the seatback. The airbag is rearwardly deployable from the rear side of the seatback from a stored position proximate an upper end of the seatback. The at least one post includes a lower end vertically above the airbag unit with a line collinear with an axis of post elongation of the at least one post intersecting the airbag unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a simplified side view shown partially cut-away of a portion of an exemplary vehicle incorporating a forward vehicle seat in accordance with the present teachings, the forward vehicle seat of the vehicle including an inflatable safety restraint system and an adjustable headrest, the inflatable safety restraint system including an airbag mounted to a seatback of the forward vehicle seat and operative to protect an occupant in a rear seat, the airbag shown immediately after deployment.

Figure 3:
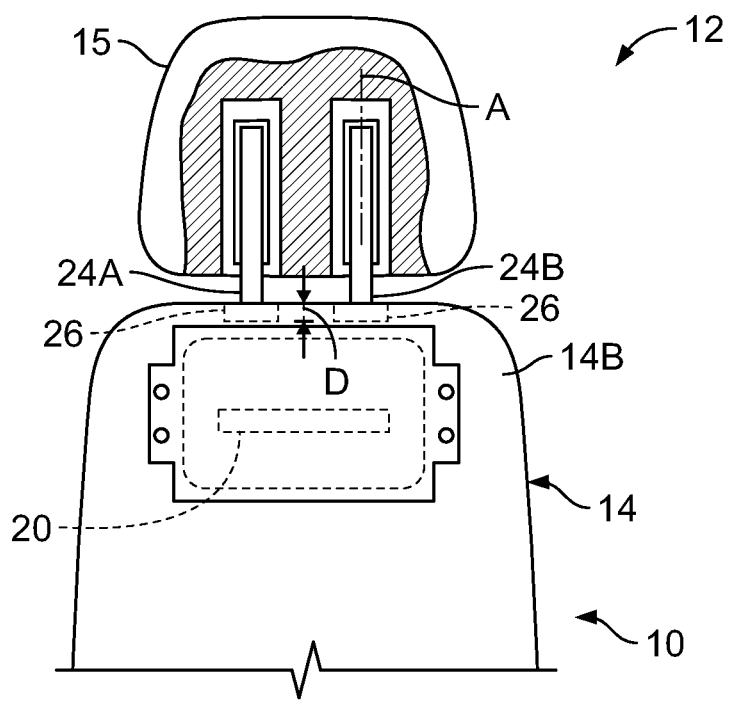
FIG. 3 is a simplified rear view of a portion of the forward vehicle seat of FIG. 1, the headrest shown cut-away.
Figure 7:
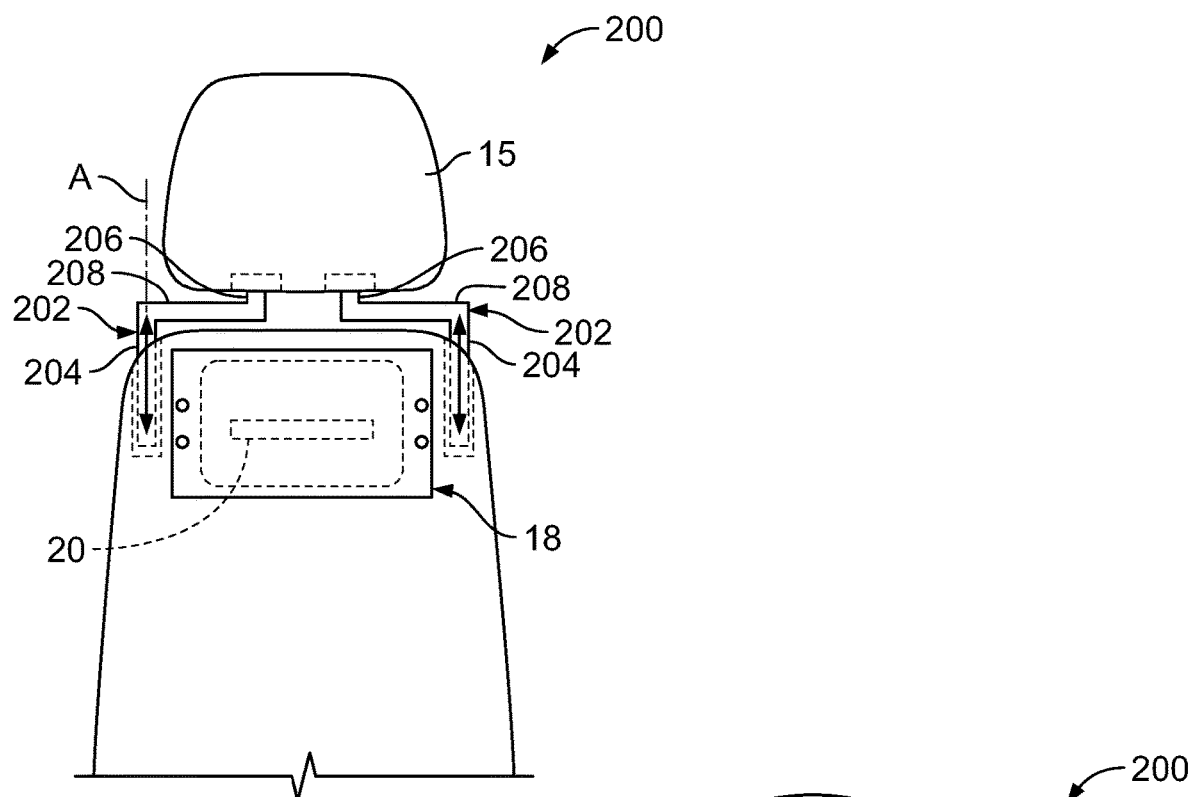

FIG. 7 is a simplified rear view similar to FIG. 3, illustrating a portion of an exemplary forward vehicle seat having an adjustable headrest and incorporating another inflatable safety restraint system in accordance with the present teachings, the inflatable safety restraint system including an airbag mounted to the seatback, the airbag shown in a stored condition and the headrest shown in a lowered position.

Figure 8:
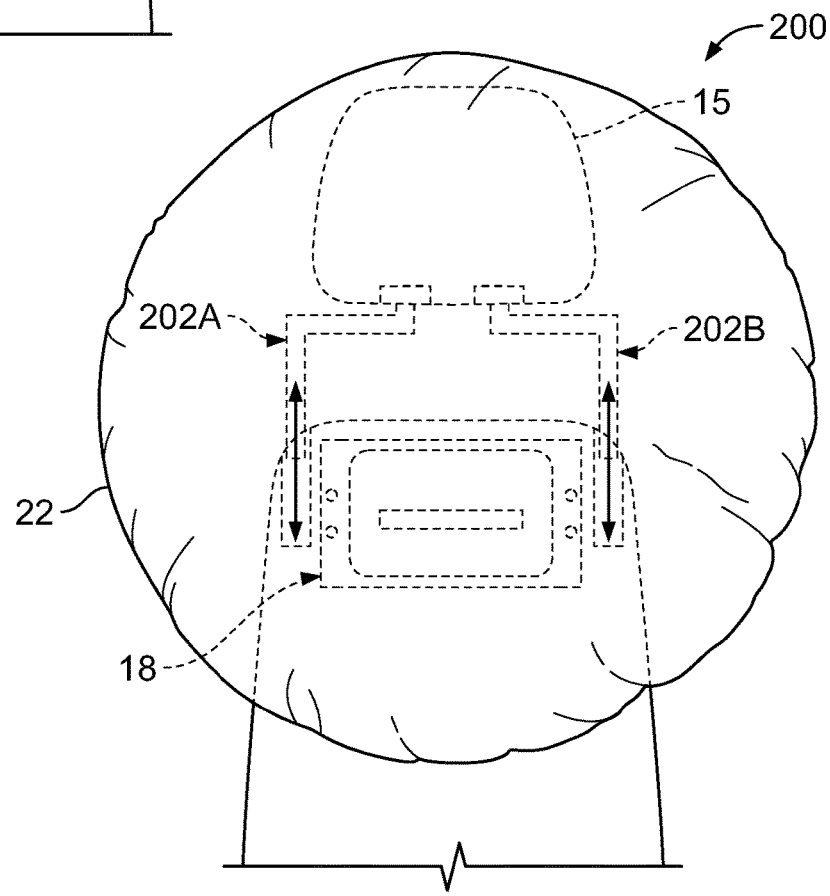

FIG. 8 is a simplified rear view of the exemplary forward vehicle seat and inflatable safety restraint system of FIG. 7, the headrest shown in a raised position and airbag shown in a deployed condition.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

Figure 1:
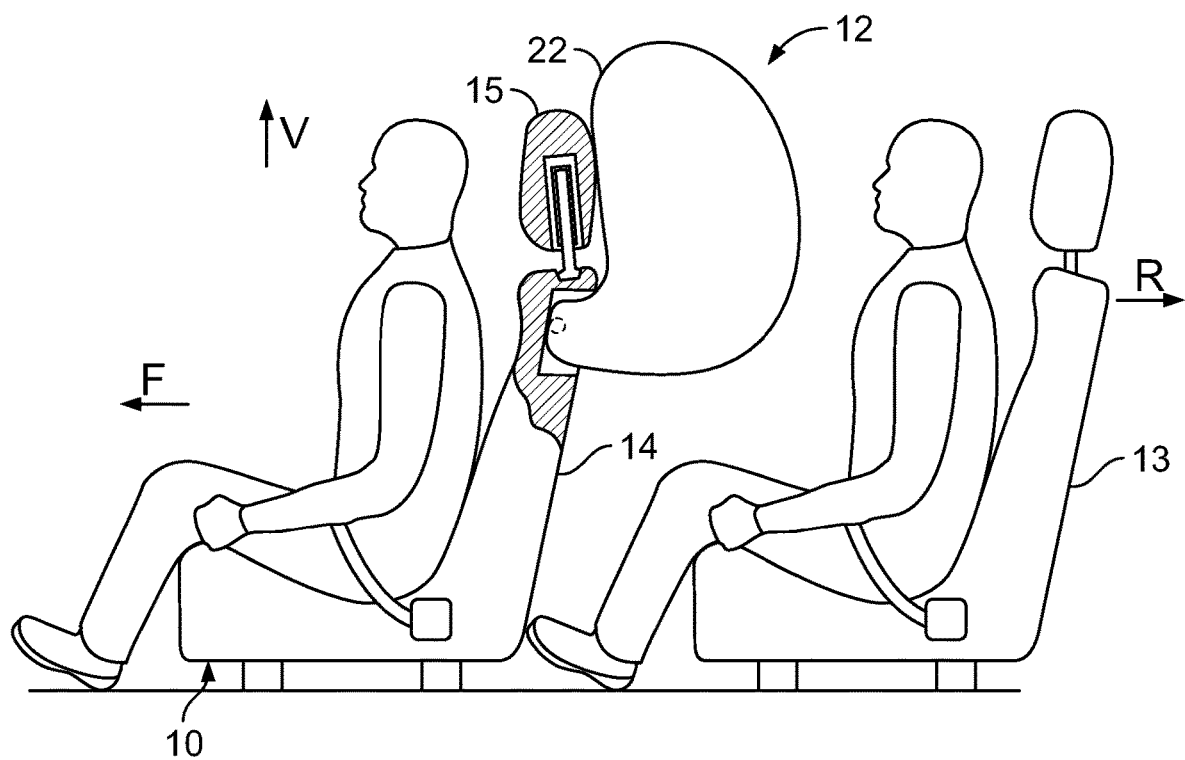
Figure 2:
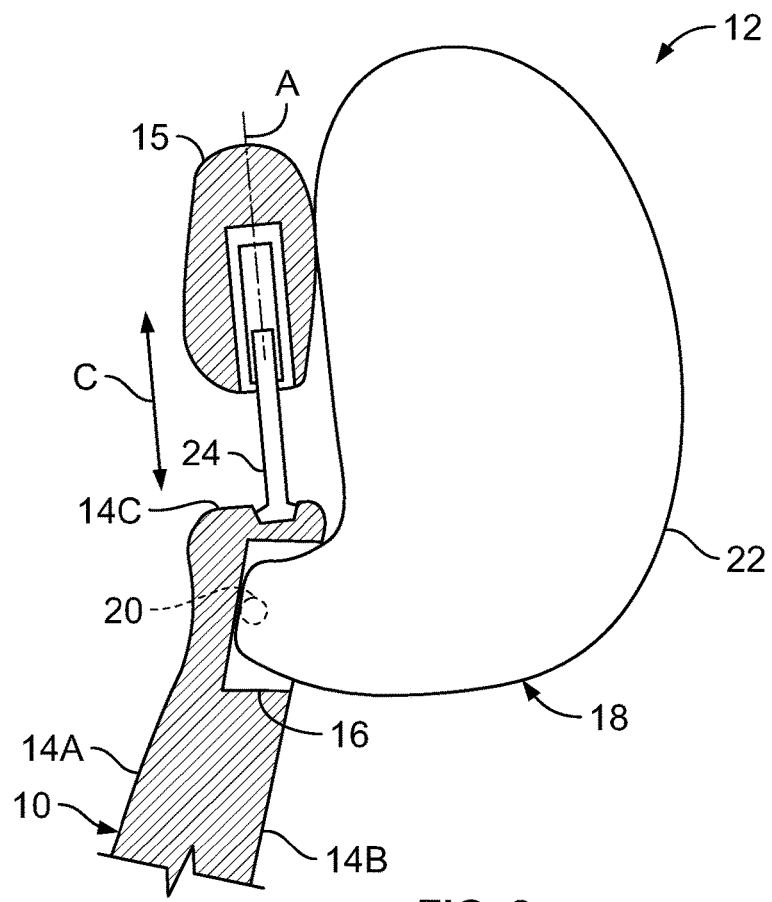
FIG. 2 is an enlarged view of a portion of the forward vehicle seat of FIG. 1.

With initial reference to FIGS. 1 through 3, a seat of a motor vehicle in accordance with the present teachings is illustrated and generally identified at reference character 10. The vehicle seat is a front or forward seat 10 of the vehicle. The terms "front seat" and "forward seat" as used herein shall be understood to mean that a further seat for a rear occupant may be behind the front or forward seat. The front or forward seat need not be the forward-most seat within a vehicle. The vehicle seat 10 includes an inflatable safety restraint system 12. In the environmental view of FIG. 1, forward vehicle seat 10 is shown in front of a rear seat 13. As will become more fully understood below, a passenger of the rear seat 13 is protected by the inflatable safety restraint system 12.

The vehicle seat 10 conventionally includes a seatback 14 and a headrest 15. The seatback 14 has a front side 14A and a rear side 14B. It will be understood that the particular seat 10 illustrated is merely exemplary. In this regard, the present teachings may be adapted to various other seats within the scope of the present teachings.

The inflatable safety restraint system 12 generally includes a housing 16 which is part of an airbag unit 18. The housing 16 is located in the rear side 14B of the seatback 14. The airbag unit 18 further includes an inflator 20 and an airbag 22. The inflator 20 may be in the form of a gas generator, for example.

The airbag 22 may be of a multiple-piece construction with side panels to create a desired shape or profile, or alternatively may be a 2-panel or single panel "pillow" type construction which uses a combination of pleats, internal tethers, external tethers, and/or non-inflated regions to create the desired shape. The fabric of the airbag 22 may be OPW (one-piece woven), and may include internal woven-in-tethers and non-inflated areas (zero length tethers) to control cushion geometry and reduce complexity/cost. The airbag 22 may be normally stored within the housing 16. In this regard, the airbag 22 may be roll-folded, z-folded or otherwise stored in the housing 16.

In FIGS. 1 and 2, for example, the airbag 22 is shown in an inflated or fully deployed state free of outside forces. Explaining further, the airbag 22 is shown in this view before the occupant encounters the airbag 22. The seatback 14 of the vehicle seat 10 is shown throughout the drawings within a standard inclination range between 15° and 45°. The term "fully inflated" may be used herein to reference the state of the airbag when it is deployed and free of outside forces. For reference, the forward and rearward vehicle directions are shown in the drawings at arrow F and arrow R (see FIG. 1), respectively. An upward vertical direction is identified at reference arrow V. As used herein, the term "rearward" will be understood to be rearward relative to the vehicle or in the direction of arrow R.

The fully inflated airbag 22 is shown to extend rearwardly from the seatback 14 proximate an upper end of the seatback 14 and upwardly from the housing 16 of the airbag unit 18. The airbag 22 has a volume and size for properly covering the top of the seatback 14 and the headrest 15 and to thereby protect the rear seat occupant 13. It will be understood, however, that the particular configuration of the airbag 22 is exemplary and that the present teachings may be used with various other airbags deployable from a rear side 14B of a seatback 14. Some additional examples are shown in commonly assigned U.S. Ser. No. 62/500,646. U.S. Ser. No. 62/500,646 is incorporated by reference as if fully set forth herein.

In the particular application illustrated, the airbag 22 is intended to extend substantially across a single seat 10 in a cross-car direction. In this particular application, the airbag 22 may have a volume between approximately 20 L and 40 L. It will be understood that this volume is exemplary and may be modified within the scope of the present teachings. It will also be understood that the width of the airbag may be increased to adapt the present teachings to protect multiple rear seat occupants.

The headrest 15 is connected to the seatback 14 by at least one post 24. In the embodiment illustrated, the at least one post 24 adjustably connects the headrest 15 with the seatback 14. For example, the headrest may be height adjustable relative to the seatback 14. Further in the embodiment illustrated, the at least one post 24 includes a first post 24A and a second post 24B. Each post 24 is elongated along a post axis A. The headrest may be height adjustable in a direction C parallel to the post axes A.

Each of the posts 24 includes a lower end 26 mounted to a top 14C of the seatback 14. The lower ends 26 may be mounted to the seatback 14 in any suitable manner. In the embodiment shown in FIGS. 1-3 of the drawings, the lower ends 26 of the posts 24 are fixedly mounted to the top of the seatback 14 such that the lower ends do not articulate or otherwise move relative to the seatback 14.

The lower ends 26 of the posts 24 downwardly extend into the seatback 14 a maximum distance D. The maximum distance D is limited for purposes of increasing the packaging space available for the airbag unit 18 within the seatback 14. The maximum distance D is preferably no more than 100 mm. More preferably, the maximum distance D is no more than 50 mm. Most preferably, the maximum distance D is no more than 25 mm. It will be appreciated that the present teachings allow a distance from the top 146 of the seatback 14 to the airbag unit 18 to be reduced. One resultant benefit is that the airbag size may be reduced by locating the airbag 22 in the seatback 14 closest to potential head impact. This provides flexibility to mount the airbag 22 very high in the seatback 14.

Each of the posts 24 includes an upper end 28 telescopically received with the headrest 15. The headrest 15 may conventionally include detents that cooperate with the posts 24. Alternatively, the headrest 15 may include telescoping tubes that cooperate with the posts. It will be understood that the posts 24 may be adjustably received by the headrest 15 in any manner well known in the art.

Each of the posts 24 is oriented relative to the airbag unit 18 in a position which the lower end 26 of each post is vertically above the airbag unit 18 with a line collinear with the axis of post elongation A intersecting the airbag unit 18.

Figure 4:
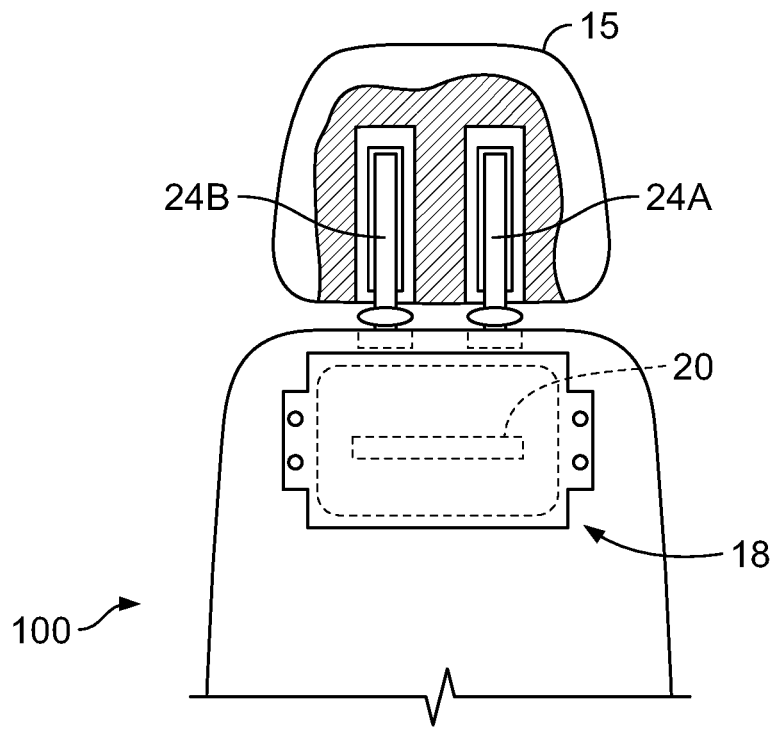
FIG. 4 is a simplified rear view similar to FIG. 3, illustrating another forward vehicle seat in accordance with the present teachings, the airbag unit mounted to the seatback, the airbag of the airbag unit shown in a stored condition, and the headrest shown in a lowered position.
Figure 5:
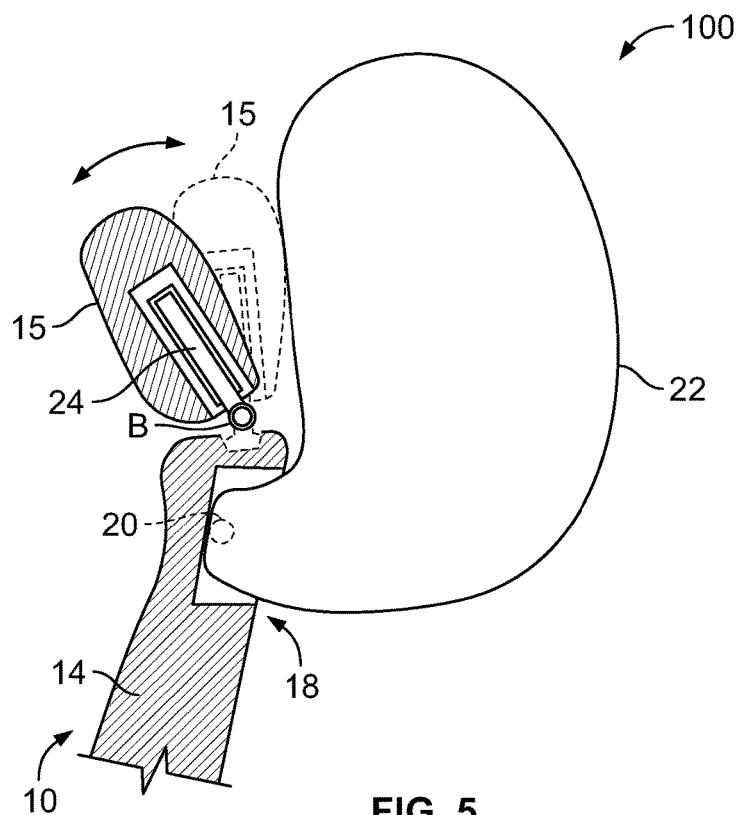
FIG. 5 is a simplified side view of the vehicle seat of FIG. 4, the vehicle seat shown in section and the inflatable restraint system of FIG. 4 shown after deployment of the airbag.
Figure 6:
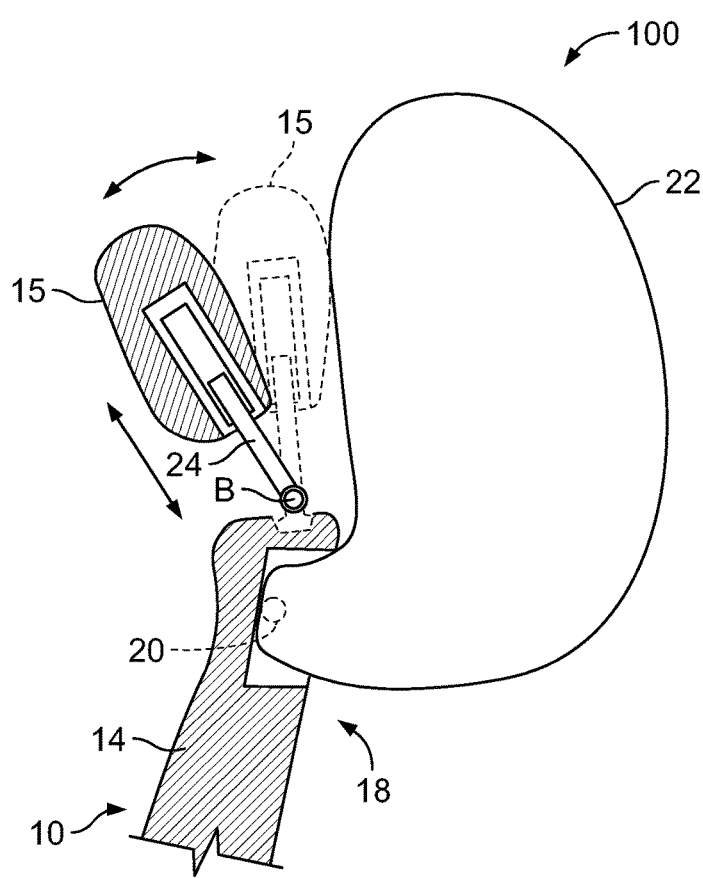
FIG. 6 is simplified side view similar to FIG. 4, the headrest shown in a raised position.

Turning to FIGS. 4 through 6, another vehicle seat in accordance with the present teachings is illustrated and generally identified at reference character 100. Given the similarities between the vehicle seat 100 and the vehicle seat 10, common reference characters will be used to identify similar elements. The vehicle seat 100 differs from the vehicle seat 10 in that the headrest 15 may articulate relative to the seatback 15 about an axis B. This articulable coupling between the seatback 15 and the posts 24 of the headrest 15 may be accomplished in any suitable manner. In the embodiment illustrated, the lower ends of the posts 24 are angularly adjustable relative to the seatback 14. It will be understood, however, that the angular adjustment of the headrest 15 may be at any point along the posts 24 within the scope of the present teachings.

In FIG. 4, the airbag 22 of the airbag unit 18 is shown in a stored condition, and the headrest 15 is shown in a lowered position. In FIG. 5, the airbag 22 is in a deployed position and the headrest 15 remains in the lowered position. The headrest 15 may be articulated about the pivot axis B between an upright position (shown in dashed lines) and a forward position (shown in solid lines). In FIG. 6, the headrest 15 is shown in the extended position.

Turning to FIGS. 7 and 8, another vehicle seat in accordance with the present teachings is illustrated and generally identified at reference character 200. Again, given the similarities between the vehicle seat 200 and the vehicle seat 10, common reference characters will be used to identify similar elements. The vehicle seat 200 principally differs from the vehicle 10 by incorporating at least one post 202 that is laterally disposed relative to the airbag unit 18.

The headrest 15 is connected to the seatback 14 by at least one post 202. In the embodiment illustrated, the at least one post 202 adjustably connects the headrest 15 with the seatback 14. For example, the headrest 15 may be height adjustable relative to the seatback 14. Further in the embodiment illustrated, the at least one post 202 includes a first post 202A and a second post 202B. Each post 202 includes a lower portion 204 coupled to the seatback 14 and an upper portion 206 coupled to the headrest 15. The posts 202 may be laterally spaced from an airbag unit 18 carried at the rear side 14B of the seatback 14. More particularly, the lower portions 204 of the posts 202 may be laterally spaced from an airbag unit 18. As the term laterally spaced is used herein, it will be understood that the at least the portion of the at least one post with the seatback 14 is disposed relative to the airbag unit 18 in an inboard or outboard direction. This lateral spacing of the posts 202 relative to the airbag unit 18 increases the packaging space available for the airbag unit 18 within the seatback 14.

The headrest 15 may be height adjustable in a direction parallel to post axes A. In the embodiment illustrated, the lower portions 204 of the posts 202 are telescopically received with the seatback 14. The seatback 14 may include detents that cooperate with the lower portions 204 of the posts 202. Alternatively, the seatback 14 may include telescoping tubes that cooperate with the lower portions 204 of the posts 202. It will be understood that the lower portions 204 of the posts 202 may be adjustably received by the seatback 14 in any manner well known in the art. The lower portions 204 of the posts 202 define the axes A along which the headrest 15 moves relative to the seatback 14.

Each of the posts 202 may further include an intermediate portion 208 between the lower portion 204 and the upper portion 206. The intermediate portion 208 may be perpendicular to both the lower portion 204 and the upper portion 206. If the headrest 15 is sufficiently wide (i.e., in a cross-car direction), the upper and lower portions 206 and 204 may be collinear with one another.

The upper portion 206 of each post 202 may be fixedly secured to the headrest 15 such that there is no movement between the upper portion 206 and the headrest. Alternatively, the upper portion 206 of each post 202 may be telescopically received by the headrest 15 (e.g., in a manner discussed above with regard to the embodiment of FIGS. 1-3) and the lower portions 204 may be fixed to the seatback 14 such that there is no movement between the lower portions 204 and the seatback 14. In other alternative applications, the headrest 15 may articulate/pivot relative to the upper portions of the posts 202 (e.g., to provide the articulation discussed about with regard to the embodiment of FIGS. 4-6).

Accordingly, the present teachings provide embodiments of a vehicle seat that allow for a rear occupant airbag with a reduced airbag cushion size while achieving proper coverage of the top of the seatback 14 and headrest 15. In this regard, it is possible to mount the airbag unit 18 in close proximity to the top 14C (see FIG. 2, for example) of the seatback 14. The present teachings overcome significant challenges due to the reduced packaging space available in the seatback proximate the top of the seatback.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, where the present teachings are used in connection with a bench seat, a single airbag may extend across all seating positions and may be deployed by a single inflator.

What is claimed is:

1. A vehicle seat comprising:
   a seatback having a front side and a rear side;
   a headrest connected to the seatback by at least one post, the headrest adjustable relative to the seatback;
   an airbag housing recessed into the seatback; and
   an airbag unit including an airbag and an inflator, the airbag unit stowed within the housing, the airbag rearwardly deployable from the rear side of the seatback from a stored position proximate an upper end of the seatback,
   wherein the at least one post is oriented relative to the airbag unit such that the at least one post includes a lower end vertically above the airbag unit with a line collinear with an axis of post elongation of the at least one post intersecting the airbag when the airbag is stowed within the airbag housing.

2. The vehicle seat of claim 1, wherein the headrest is adjustable relative to the seat in a direction parallel to the axis of post elongation.

3. The vehicle seat of claim 1, wherein the airbag unit is downwardly spaced from an upper end of the seatback by a distance no greater than 100 mm.

4. The vehicle seat of claim 1, wherein the airbag unit is downwardly spaced from an upper end of the seatback by a distance no greater than 50 mm.

5. The vehicle seat of claim 1, wherein the airbag unit is downwardly spaced from an upper end of the seatback by a distance no greater than 25 mm.

6. The vehicle seat of claim 1, wherein the at least one post includes a lower end vertically above the airbag unit with a line along an elongated axis of the at least one post intersecting the airbag unit.

7. The vehicle seat of claim 1, wherein the at least one post includes a first post and a second post.

8. The vehicle seat of claim 1, wherein the lower end of the at least one post is mounted to a top of the seatback.

9. The vehicle seat of claim 1, wherein the at least one post is angularly adjustable relative to the seatback.

10. The vehicle seat of claim 1, wherein an upper end of the at least one post is telescopically received within the headrest.

11. A vehicle seat comprising:
    a seatback having a front side and a rear side;
    a headrest;
    at least one post adjustably connecting the headrest and the seatback; the headrest adjustable relative to the seatback in a vertical direction; and
    an airbag unit including a housing, recessed into the seatback, an airbag and an inflator, the airbag stowed in the housing, the airbag rearwardly deployable from the rear side of the seatback from a stored position proximate an upper end of the seatback,
    wherein the at least one post includes a lower end vertically above the airbag unit with a line collinear with an axis of post elongation of the at least one post intersects the airbag of the airbag unit when the airbag is stowed within the airbag housing.

12. The vehicle seat of claim 11, wherein the headrest is adjustable relative to the seat in a direction parallel to the axis of post elongation.

13. The vehicle seat of claim 11, wherein the at least one post includes a first post and a second post, both of the first and second posts including a lower end vertically above the airbag unit with a line collinear with an axis of post elongation of the at least one post intersects the airbag unit.

14. A vehicle seat comprising:
    a seatback having a front side and a rear side;
    a headrest connected to the seatback by at least one post, the headrest adjustable relative to the seatback; and
    an airbag unit including an airbag and an inflator, the airbag unit carried by the seatback, the airbag rearwardly deployable from the rear side of the seatback from a stored position proximate an upper end of the seatback,
    wherein the at least one post is oriented relative to the airbag unit in a position selected from a group consisting of a first position in which the at least one post includes a lower end vertically above the airbag unit with a line collinear with an axis of post elongation of the at least one post intersecting the airbag,
    wherein the at least one post includes an upper portion engaging the headrest and a lower portion engaging the seatback, the upper and lower portions being parallel to and laterally spaced from each other.

15. The vehicle seat of claim 14, wherein the at least one post further includes an intermediate portion laterally extending between the upper and lower portions.

16. The vehicle seat of claim 15, wherein the lower portion is telescopically received by the seatback.

\* \* \* \* \*